United States Patent
Fujii et al.

(10) Patent No.: US 7,464,456 B2
(45) Date of Patent: Dec. 16, 2008

(54) SLIDER SEPARATING METHOD

(75) Inventors: Ryuji Fujii, Hong Kong (CN); ChunFei Cheung, Hong Kong (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 428 days.

(21) Appl. No.: 11/285,219

(22) Filed: Nov. 23, 2005

(65) Prior Publication Data
US 2006/0130315 A1    Jun. 22, 2006

(30) Foreign Application Priority Data
Nov. 23, 2004    (CN)    .................... 2004 1 0092886

(51) Int. Cl.
*G11B 5/127*    (2006.01)
*H04R 31/00*    (2006.01)

(52) U.S. Cl. .................... 29/603.16; 29/417; 29/603.13; 29/603.15; 29/603.18; 360/122; 360/317; 451/5; 451/41

(58) Field of Classification Search .................... 29/417, 29/603.1, 603.12–603.16, 603.17, 743; 360/122, 360/317; 415/5, 41

See application file for complete search history.

(56) References Cited

U.S. PATENT DOCUMENTS

| | | | | |
|---|---|---|---|---|
| 5,850,320 | A * | 12/1998 | Warmka et al. | .......... 360/245.2 |
| 6,687,976 | B1 * | 2/2004 | Koyama et al. | .......... 29/603.12 |
| 6,822,465 | B1 * | 11/2004 | Babcock et al. | ............. 324/760 |

FOREIGN PATENT DOCUMENTS

| | | |
|---|---|---|
| JP | 2001-101635 | 4/2001 |
| JP | 2001-126225 | 5/2001 |

* cited by examiner

*Primary Examiner*—Paul D Kim
(74) *Attorney, Agent, or Firm*—Nixon & Vanderhye P.C.

(57) ABSTRACT

A slider separating method includes bonding a row bar containing a plurality of slider-forming portions to a bonding surface of a cutting fixture along a side surface that extends in its length direction; cutting the row bar bonded on the cutting fixture into individual sliders along cutting gaps provided between the slider-forming portions; decreasing bonding force between each diced slider and the bonding surface; and separating the sliders with decreased bonding force from the cutting fixture by pushing each slider along a side direction being parallel to the bonding surface and perpendicular to the length direction and holding and receiving the slider to a slider tray having recesses formed therein which is partitioned according to the sliders. The method can reliably and efficiently separate a row bar containing a plurality of slider-forming portions into individual sliders without depending upon size or arrangement pitch of the sliders and hold these sliders.

8 Claims, 7 Drawing Sheets

SLIDER SEPARATING METHOD

FIELD OF THE INVENTION

The present invention relates to a method and device for manufacturing sliders incorporating thin film magnetic elements, and more particularly to a method and device for separating a row bar constituting with a plurality of sliders in array into individual sliders.

BACKGROUND OF THE INVENTION

As a recording media with high speed, big capacity, high reliability and low cost, disk drives are widely used for digital information recording. With the development of information technology in recent years, the recording density of a disk drive has been developed to exceed 100 GB per square inch. The disk drive includes a slider incorporating thin film magnetic elements for recording and reproducing data information stored in the recording media. A surface of the slider facing to the recording media is referred as air bearing surface (ABS).

For example, a slider manufacturing process may be performed as follows: firstly, forming a predetermined deposition film on a wafer; then, cutting off the wafer along a cutting section on which the ABS is exposed, thus forming a row bar on which a plurality sliders arrayed in line; next, mounting the row bar to a holding fixture for lapping, pressing the row bar onto a revolving lapping surface of the holding fixture, and lapping a surface of the row bar to form the ABS; next, offloading the row bar from the holding fixture, collecting a plurality of row bars together according to actual requirement, and machining the ABS to form rails thereon. Here the rails are concave and convex surfaces formed on the ABS and flying over the rotating recording medium in a predetermined height when the slider is in a recording or reproducing operation; then securing the row bar on a cutting fixture and dicing it into individual sliders. At the time, all the slider are separated from each other while still maintaining as an aggregate since all the sliders are still fixed on the cutting fixture; after that, taking all the sliders one by one from the cutting fixture and receiving them in a slider tray.

The above-mentioned process may take various forms of embodiments, however, for slider lapping or rail machining process, the process is implemented based on the aggregate of sliders, and then the slider is separated from each other after completion of the process. It is for sake of working efficiency and product management. As slider is tiny, it is better to perform these processes in a slider-aggregate state prior to slider separating process. According to electric characteristics of each slider measured before they are separated into individual sliders, defective products are sorted out from the separated sliders that are received in the slider tray, and only non-defective products are cleaned and assembled to head gimbal assemblies (HGAs).

Figure 8A:
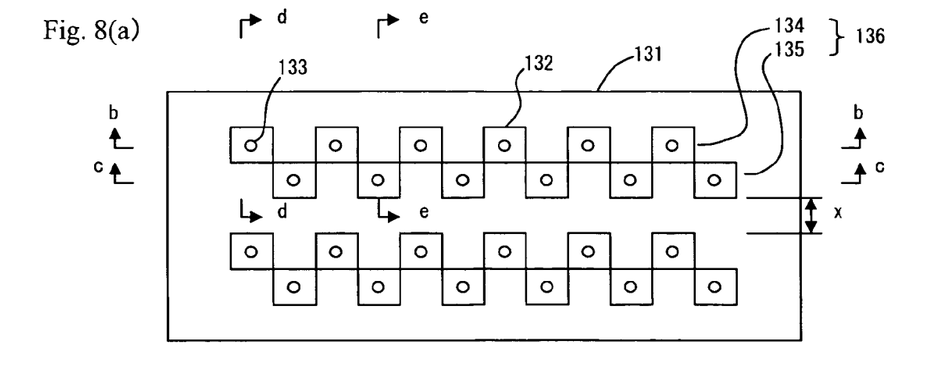
FIGS. 8(a)-8(e) are plan views illustrating a conventional slider separating method.
Figure 8B:
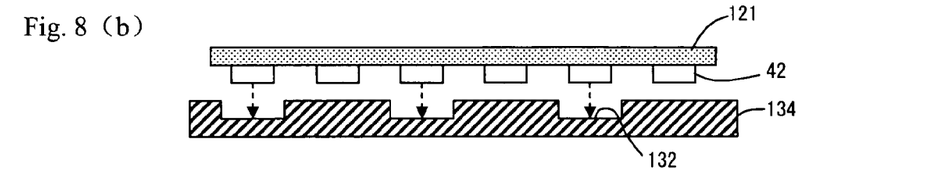
Figure 8C:
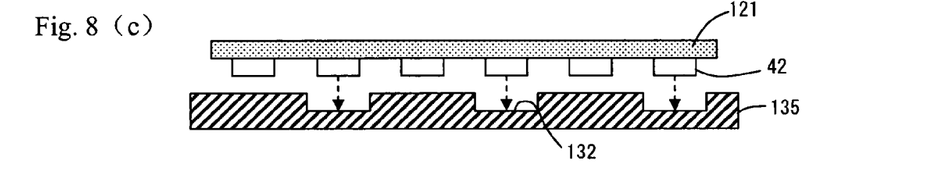
Figure 8D:
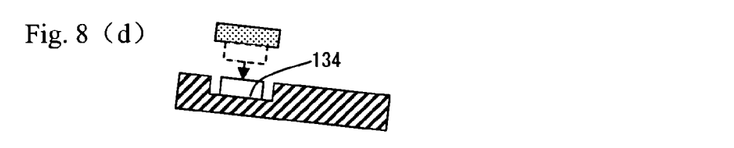
Figure 8E:
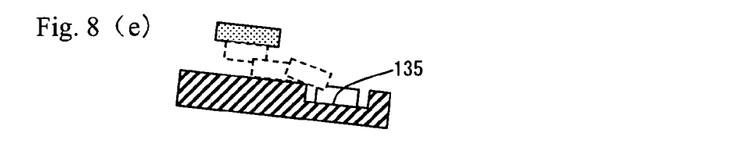

Now the process of separating sliders from the cutting fixture is described in further detail. In the past, the above process is performed as follows: heating the slider through a heated plate and then melting an adhesive (refer to Japanese patent publication No. 2001-101635 and Japanese patent publication No. 2001-126225). FIG. 8 is an illustration view of the separating process. FIG. 8(a) shows a plan view of a slider tray which receives separated sliders therein; FIGS. 8(b)-8(c) show cross-sectional views taken along lines b-b and c-c of FIG. 8(a) respectively; FIGS. 8(c)-8(d) show cross-sectional views taken along lines d-d and e-e of FIG. 8(a) respectively. As illustrated in FIG. 8(a), defined in the slider tray 131 are a number of recesses 132 which are arrayed in an interlacing state, and pitch formed between adjacent two of which is of the same distance as that formed between adjacent two sliders. The recess 132 has an aperture 133 defined on bottom surface thereof. The interlaced arrays comprise a first array 134 and a second array 135, and a recess group 136 constructed by these arrays accommodates all sliders of a row bar. Several recess groups 136 may be formed in the slider tray 131, and as will be illustrated in later, several row bars may be handled simultaneously.

As illustrated in FIGS. 8(b)-8(e), the cutting fixture 121 loaded with the sliders 42 faces downwardly, so that the sliders 42 are exposed to the recesses 132 of the first array 134. The slider tray 131 inclines downwards slightly from the first array 134 to the second array 135. By this inclination configuration, when the slider tray 131 is dipped into NMP (N-Methyl-2-Pyrrolidone) solvent, the NMP (N-Methyl-2-Pyrrolidone) solvent will be immersed into the recess 132 through the aperture 133 of the recess 132, and dissolve the adhesive disposed between the slider 42 and the cutting fixture 121, such that the slider 42 is disconnected with the cutting fixture 121. The sliders 42 associated with the first array 134 fall into the recesses 132 thereof directly, and those associated with the second array 135 glide on the slider tray 131 under action of gravity and then fall into the recesses 132 of the second array 135. Consequently, the sliders are separated from the row bar and collected into the recesses 132. Here, the recesses 132 take the interlacement configuration rather than a linear configuration, since the linear configuration results in inter-walls between two recesses thinning and thus sufficient stiffness cannot be guaranteed.

Next, defective and non-defective sliders are sorted out according to electric characteristics of the sliders measured before they are separated. However, as discussed above, as the sliders are very tiny, when being moved to the slider tray 131, the sliders arranged on the row bar may not be received in the slider tray 131 in their original sequence. Especially, with further miniaturization of the slider, the weight of a slider is reduced to be lower than 0.1 g, thus any slight shock or air flow may cause the slider moving, accordingly, the rate of slider disorder may still be increased. If this instance happens, it is needed to read a slider ID code attached on the deposition surface of a slider. The ID code is shown on the deposition surface, and each number takes size of 5×10 μm. However, when the sliders enter into the slider tray 131, the ID code becomes unreadable since the deposition surface is in side surface position. Accordingly, gripping tools, such as tweezers are needed to fetch out the sliders from the slider tray 131 one by one, and then the ID code on the side surface is identified using a microscope.

Reference patent 1: Japanese Patent Application NO. 2001-101635

Reference patent 2: Japanese Patent Application NO. 2001-126225

However, in the prior art, since the pitch arrangement of the recesses of the slider tray depends upon the arrangement pitch of the sliders, so the following problems arise.

Firstly, a new slider tray should be manufactured each time when the pitch of the slider is changed. Namely, as described above, the arrangement pitch between the recesses of the slider tray is designed as the same as that of the sliders of the row bar. Consequently, it is necessary to reduce the slider pitch of the row bar (i.e., improve integration degree of the chip) for purpose of increasing slider yield of each row bar; hence, a new slider tray should be manufactured each time when the pitch of a slider is altered.

Even if the above problems are ignored, the following problems still exist in prior arts. Firstly, suppose that size of slider is constant and only cut gap between sliders is shortened, thus thickness of the partition-walls between the recesses must be reduced. However, it is difficult to manufacture a slider tray with thin partition-walls, because the machining size limit of the thickness of partition-wall is about 100 μm.

In addition, mini-type slider, such as 20% slider (approximate size: 0.7×0.8×0.23 mm) developed in recent years also reduces the recess size with reduction of the slider. However, as described above, as inspection of the sliders is performed by manual, it is very difficult to fetch out the sliders from the size-reduced recesses or put them in the size-reduced recesses. Consequently, in slider inspection process, it is prone to put the defective sliders into other recesses wrongly, and then make the defective sliders enter into later manufacturing process. Furthermore, as a plurality of sliders are moved totally at the same time, there is a possibility to make them all get into a mess state due to a single error, and it is required to re-determine the ID codes of the sliders which ID codes are missed from monitoring.

Additionally, the slider-separating method in the prior art also causes the following problems. Specifically, the cutting fixture contacts with the slider tray when separating the sliders, and pitch x between recess domains is confined by thickness of the cutting fixture (refer to FIG. 7(a)). Thus it is difficult to form recesses in regions located between the recess domains, thus the regions are vacant and slider capacity is limited. In the following conditions, it will become problematic. Namely, when the above process is operated, many particles are stick to the sliders and few particles are stick to the slider trays (though the slider trays are constructed of particle-free material, in fact few particle may still be generated), accordingly, the sliders are required to be cleaned. Since it is prohibited to have tiny particle attached on the ABS of the slider in cleaning process, the sliders are cleaned in a very rigid environment, and a whole cleaning cycle is time-consuming and high costly. Therefore, it is desired to reduce cleaning cycles. As the cleaning process is implemented based on a whole slider tray, it is desired for a slider tray to contain sliders as many as possible. However, the amount of the sliders which can be contained by the slider tray is limited due to reasons described above, accordingly, the cleaning efficiency can not be improved.

In addition, there are still the following problems in prior art: the recesses arrangement is too jammed, the slider tray stiffness is insufficient or the sliders processing is obstructed because the arrangement pitch of the recesses of the slider tray depends upon the arrangement pitch of the sliders. Furthermore, the method of separating the sliders also limits the slider numbers holding on the slider tray.

Moreover, it is also known that the NMP solvent may contaminate the ABS of the slider when the slider is dipped into the solvent for resolving adhesive. Additionally, the ABS of the slider faces the bottom of the recess when in the resolving process, thus the ABS should be turned up after handled by the resolving process. This ABS flipping work leads to low work efficiency. In addition, once all the sliders are placed into the recesses and defective sliders are sorted out and removed from the recesses (especially sorted according to electric characteristic), many recesses of the slider tray will be empty. As this empty state of the recesses result in low cleaning efficiency, it is needed for the empty recesses to be filled with other non-defective sliders. Since it is difficult to perform cleaning process for individual and independent sliders, thus in conventional technology, it is preferable to provide a process for avoiding particle contamination.

Therefore, the invention is aimed to provide a slider manufacturing method and device which are capable of separating a row bar constituting with an array of sliders, into individual sliders efficiently and reliably and then holding these sliders without dependency upon slider size or arranging pitch thereof.

SUMMARY OF THE INVENTION

A main aspect of the invention is to provide a slider separating method, which is directed to cut off a row bar constituted with slider-forming portions into individual sliders and separate these sliders.

Another aspect of the invention is to provide a slider separating device to cut off a row bar constituted with slider-forming portions into individual sliders and separate these sliders.

For achieving the above aspects, a slider separating method, which is provided for cutting a row bar constituted with a plurality of slider-forming portions along its length direction into individual sliders, includes a bonding process to bond said row bar to a bonding surface of a cutting fixture along a side surface that extends in the length direction; a cutting process to cut said row bar bonded on said cutting fixture into individual sliders along cutting gaps provided between the slider-forming portions; a bonding force decreasing process to decrease bonding force between each diced slider and the bonding surface; and a separating process to push out and separate each slider with decreased bonding force from said cutting fixture along a side direction being parallel to said bonding surface and perpendicular to said length direction.

In an embodiment of the invention, the separating process further comprises a process of pushing said slider to a position where the slider is inconsistent with its adjacent sliders when viewing from said length direction, and then holding and receiving the slider to a slider tray having recesses formed therein which is partitioned according to said sliders.

In another embodiment of the invention, a holt-melt adhesive is used for bonding in said bonding process. Said bonding force decreasing process is performed by cleaning or heating said adhesive, or by cleaning and heating said adhesive. Specifically, said holt-melt adhesive includes glycol phthalate; said bonding force decreasing process is performed by heating said adhesive to a temperature of 308K-318K so that the adhesive is in a semi-liquid status, thus preventing the slider from being moved due to external shock or air flow.

In a further embodiment, the slider separating method further comprises a holding process to hold said cutting fixture against said side direction, and said separating process is performed after said holding process. Selectively, the slider separating method may further comprises a process of attaching a slider ID code on said each slider-forming portion prior to said bonding process; and a process of reading said ID code on each slider of said row bar, comparing said ID code with corresponding data information of defective or non-defective sliders, and only separating non-defective sliders from said cutting fixture prior to said separating process. Thus the defective and non-defective sliders are distinguished and also the manufacturing process is simplified.

A slider separating device of the present invention comprises a cutting fixture, which has an bonding surface for bonding a row bar thereon along a side surface that extends in the length direction, said row bar being constituted with a plurality of slider-forming portions along its length direction;

a fixture securing member for securing said cutting fixture at a side direction that is parallel to said bonding surface and perpendicular to said length direction; and a pusher for pushing out said sliders one by one along said side direction and separating said sliders from said cutting fixture, said sliders being formed by cutting the row bar along cut gaps formed between said slider-forming portions in advance. In an embodiment of the invention, said pusher may comprise a moving mechanism capable of moving along said length direction.

As illustrated above, the slider separating method and device of the invention make it possible to inspect the sliders one by one by naked eyes, and separate these sliders reliably. The invention also provides a slider manufacturing method and device capable of reliably and efficiently dividing a row bar constituting with slider-forming portions into individual sliders and holding these sliders without depending upon size or pitch of the sliders.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various embodiments of the invention will now be described in detail in conjunction with the drawings.

Figure 1:
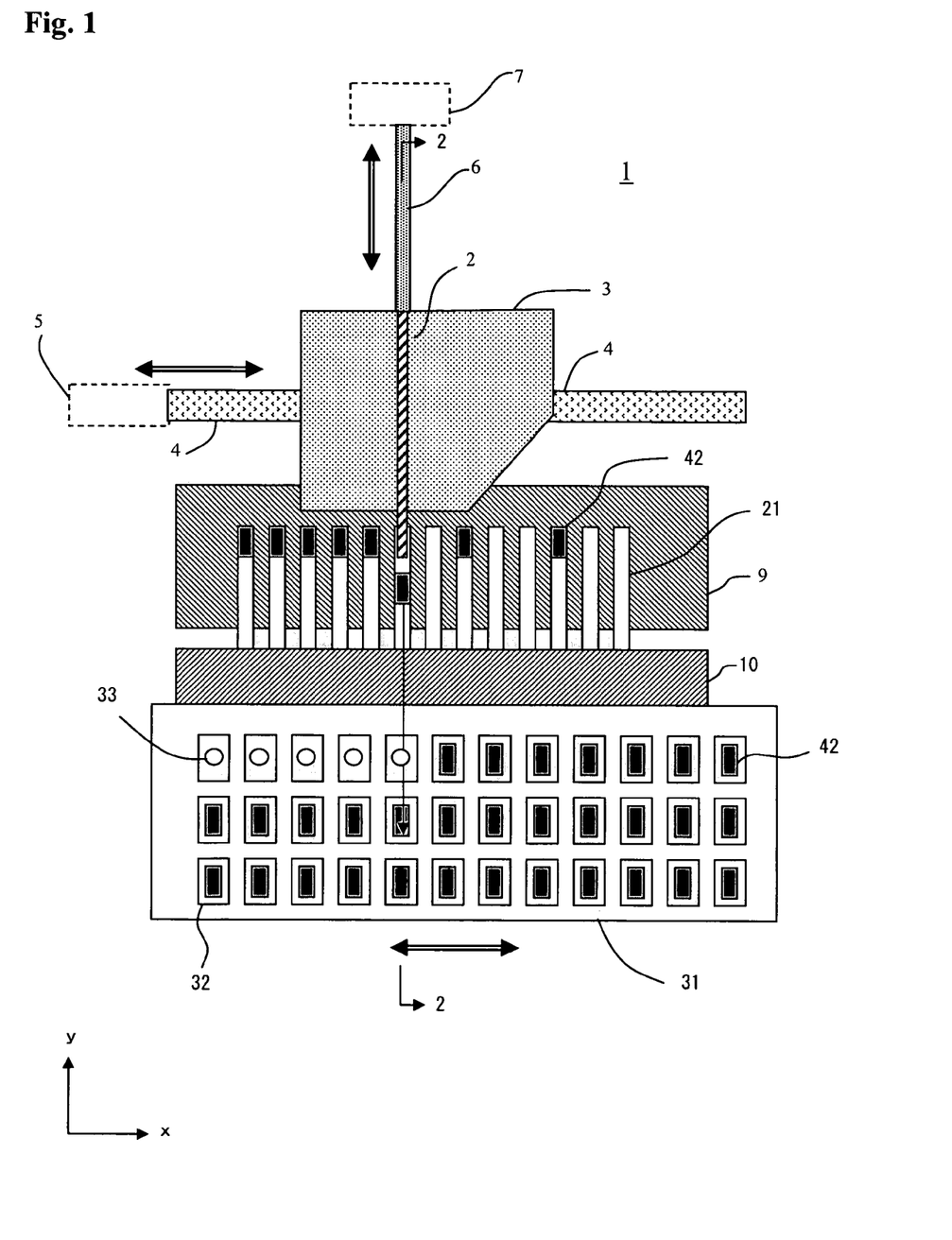
FIG. 1 is a structural plan view of a separating device according to a first embodiment of the invention.
Figure 2:
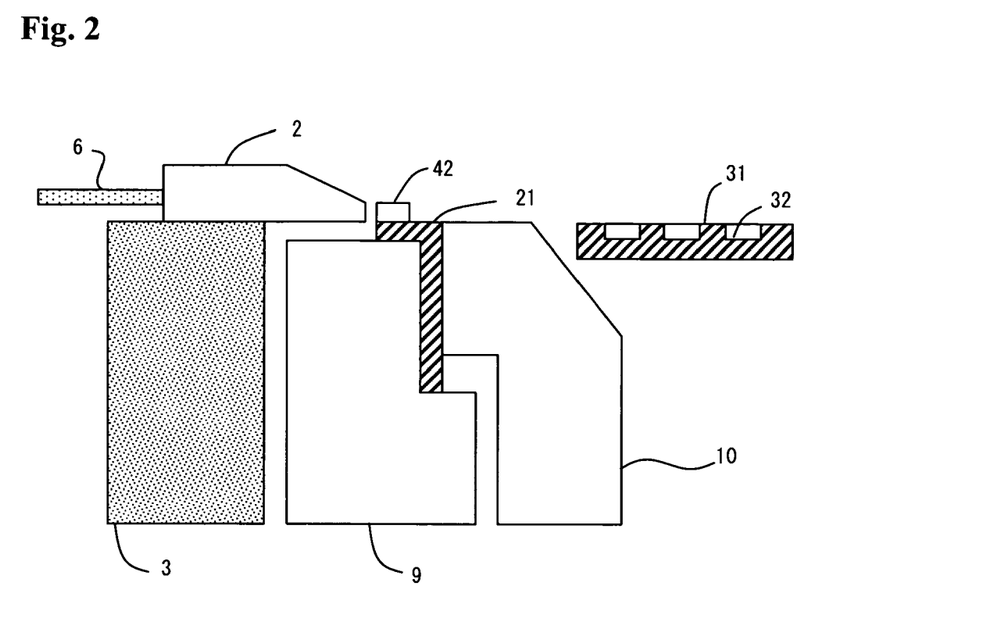
FIG. 2 shows a cross-sectional view taken along line 2-2 of the separating device shown in FIG. 1.

FIG. 1 is a plan view of a separating device according to an embodiment of the invention, and FIG. 2 is a cross-sectional view taken along line 2-2 of FIG. 1. The separating device 1 comprises a pusher 2 and a pusher table 3 to support the pusher 2. The front portion of the pusher 2 is thin and has a size equal approximately to the thickness (height) of a slider 42. The pusher 2 is made from soft plastic to prevent chipping or crack generated on the slider 42, and the pusher 2 may also be made from static electric-resistive material to prevent ESD (electric static discharge) from happening. The pusher table 3 is connected to an x direction transmission shaft 4 constructed by a ball screw assembly. The pusher table 3 can move in x direction by rotating the ball screw assembly of an x direction moving mechanism 5 which is connected to the x direction transmission shaft 4.

The pusher 2 is coupled to a y-direction transmission shaft 6 constructed by a ball screw assembly. The pusher 2 can move along y direction by rotating the ball screw assembly of the y direction moving mechanism 7. If the pusher 2 moves too rapidly at moment the slider 42 begin to be separated, then the slider 42 will spring out, therefore the slider 42 need to be pushed slowly by the pusher 2. A motor is provided on the y direction moving mechanism 7 for this purpose. In addition, as the amount of the adhesive attached on each slider 42 may be a little different from each other, thus after a cleaning process which will be described later, pushing force generated by the pusher 2 for separating each slider 42 may be also different from each other. Tremendous pushing force causes cracks or chippings on the slider 42, consequently, a pushing force sensor (not shown) is provided to the pusher 2 for avoiding forming the cracks or chippings. The pushing force sensor will be activated and stop the pushing action of the pusher 2 when a pushing force of approximately over 3.9 N (400 gf) can not move the slider 42. In addition, it is proved by the inventor of this invention that yield of chippings is very low when the pushing force is under 3.9 N.

The separating device 1 further includes an inner fixture securing member 9 and an outer fixture securing member 10 both of which are disposed at position adjacent the pusher 2. The inner fixture securing member 9 and the outer fixture securing member 10 may have a cutting fixture 21 held therebetween, and may at least hold the cutting fixture 21 along y direction when the pusher 2 separates the sliders 42 which are held on the front end portion of the cutting fixture 21 along y direction. As illustrated in FIG. 2, the top surface of the outer fixture securing member 10 and the top surface of the cutting fixture 21 are coplanar.

Preferably, a slider tray 31 may be provided at a position adjacent to the outer fixture securing member 10, when the sliders 42 are separated by the separating device 1. A plurality of recesses 32 are arranged in the slider tray 31 for receiving respective sliders 42 therein. Each recess 32 has an aperture 33 formed on its bottom surface. The shape, size and pitch arrangement of the recess 32 of the invention are free from specific limitation, and the recess 32 also has no relation with pitch or size of the sliders, furthermore, the recess may be suitably designed according to operation. The slider tray 31 may move along x direction automatically or manually.

Figure 3:
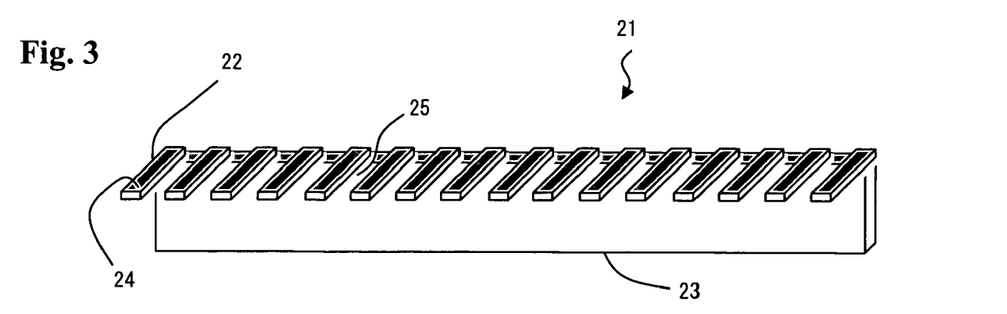
FIG. 3 is a schematic perspective view of a cutting fixture of the invention.
Figure 4:
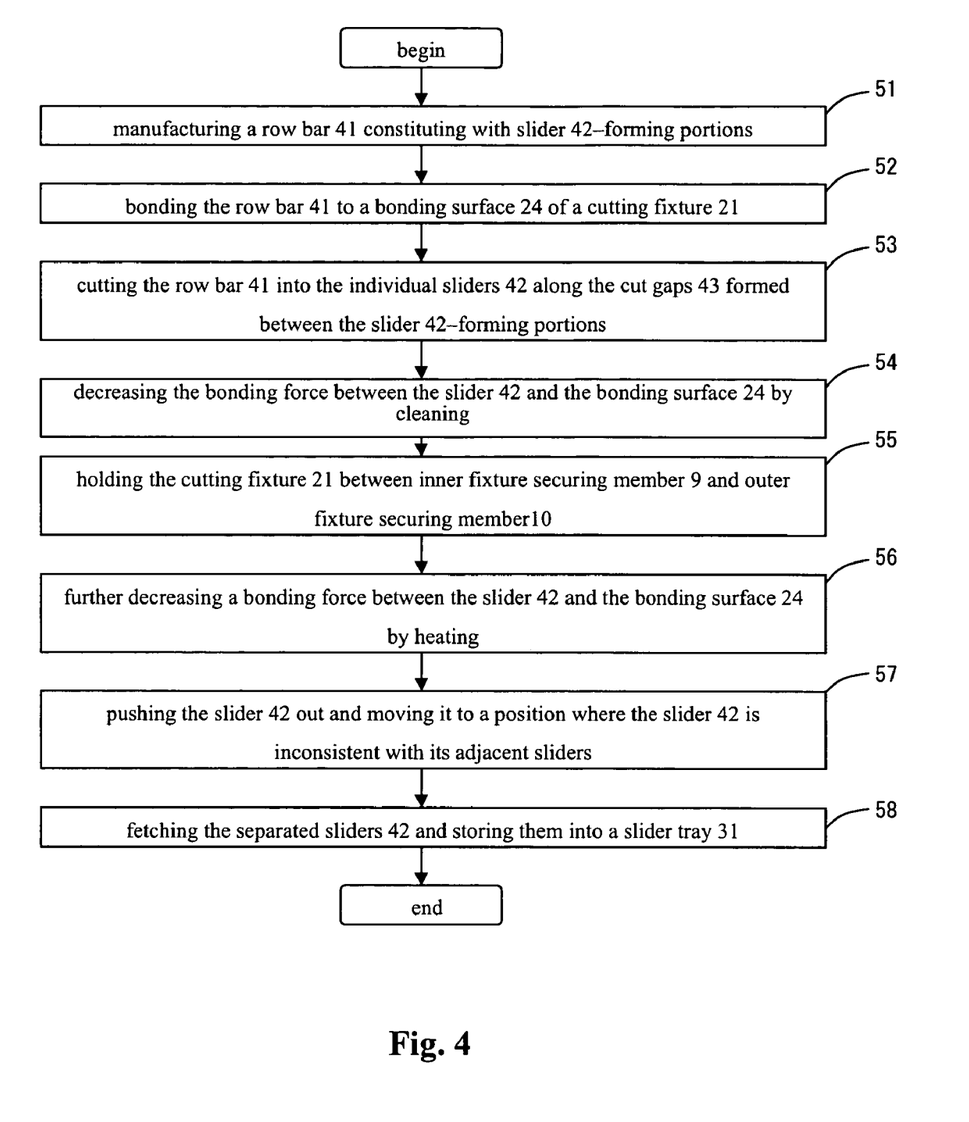
FIG. 4 shows a flow chart illustrating the process of the slider separating method of the invention.

FIG. 3 is a schematic perspective view of the cutting fixture. The cutting fixture 21 has a plurality of slider holding portions 22 for holding respective sliders 42 therein and a plurality of support plates 23 to support the corresponding slider holding portions 22. A bonding surface 24 for bonding the slider 42 thereon is formed on top surface of each slider holding portion 22. A space 25 is formed between two adjacent slider holding portions 22. The slider holding portion 22 and the support plate 23 has an integrative section in L-shape. The support plate 23 is held between the inner fixture securing member 9 and outer fixture securing member 10, while the slider holding portion 22 is loaded on the top surface of the inner fixture securing member 9.

Then, referring to FIGS. 4, 5(a)-5(b), 6(a)-6(d), a slider separating method using the separating device described above is explained. In addition, the figures in left sides of FIGS. 6(a)-6(d) represent plan views of the steps of the separating method, while those in right sides of FIGS. 6(a)-6(d) represent corresponding side views of the left sides figures.

Firstly, forming a deposition film for constituting a slider on a wafer (step 51). The deposition film may be a deposition film used in a reproducing reading/writing head incorporating a MR (magneto-resistance) element for reading, or a compound thin-film slider having a recording reading/writing head constructed by an inductive transducer. For example, the MR element may comprise an AMR (anisotropic magneto-resistance) element, a GMR (giant magneto-resistance) element, or a TMR (tunnel magneto-resistance) element. The sliders of the deposition film are formed on a wafer 71 in two-dimensional form (refer to FIG. 5(a)). Then ID code 44 is attached to the deposition surface for identifying each slider.

Figure 5A:
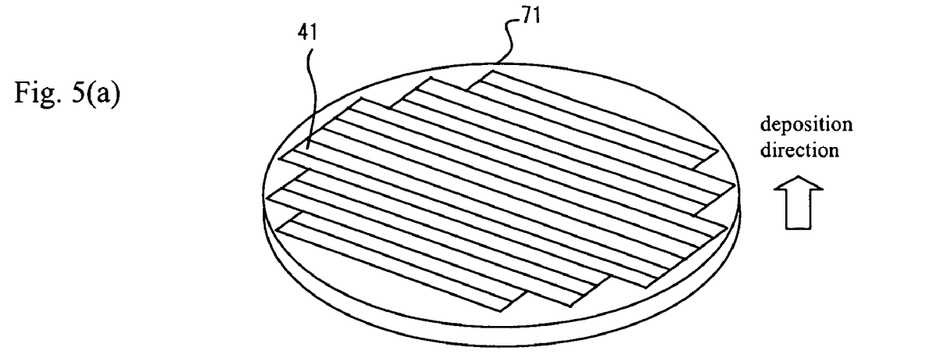
FIGS. 5(a)-5(b) are perspective views illustrating a method of forming a row bar.
Figure 5B:
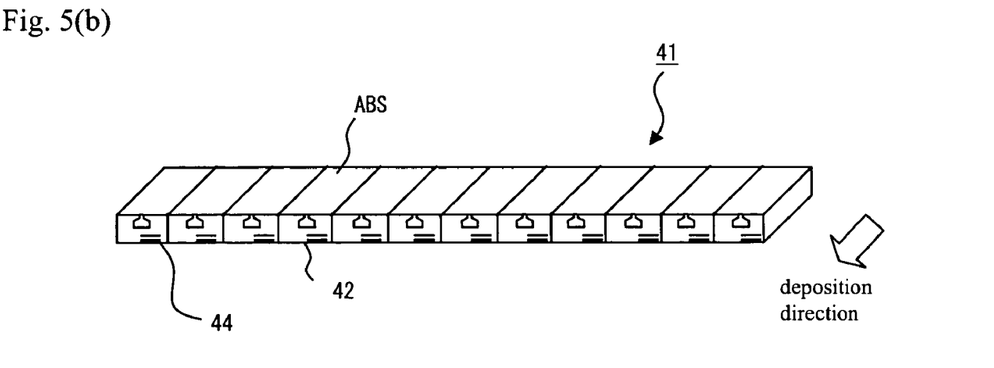

The ID code 44 may be suitable combination of numbers and symbols. Next, the wafer 71 with the deposition film deposited thereon is sliced into pluralities of ruler-shaped row bars 41 on each of which run a number of sliders 42 in a line. The row bar 41 is diced along cutting sections on each of which an ABS exposes (refer to FIG. 5(b)). In addition, FIG. 5(b) shows a perspective and 90 degrees rotated view of a row bar 41 diced from the wafer 71 shown in FIG. 5(a). Then the row bar 41 is lapped to form a predefined MR element height and a throat height of the writing element. Moreover, a rail portion is formed in the ABS such that the slider can fly over the recording medium in a suitable flying height.

Figure 6A:
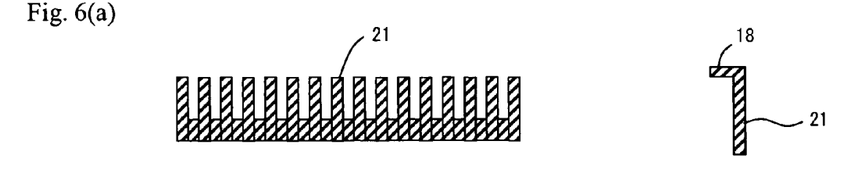
FIGS. 6(a)-6(d) are plan views illustrating the steps of the slider separating method of the invention.

Next, dispensing an adhesive 18 (refer to FIG. 6(a)) on the bonding surface 24 of the cutting fixture 21 by a dispenser (not shown) (step 52). Preferably, the adhesive 18 may be holt-melt adhesive, such as PI, glycol phthalate, which adhesion ability will get worse when being heated. Based on the factors of slider degradation or work efficiency, it is preferable to select the adhesive which melting point falls within 35-45 Celsius degrees. By using such adhesive, the degradation of the slider can be restrained when the adhesive is heated and melted with the lowest energy, at the same time the adhesive can be vulcanized (become adhesive) in environment such as cutting process, i.e., cured in normal temperature. Then attach the row bar41 at its one side surface that extends along the length direction of the row bar to the melted adhesive 18. Selectively, the adhesive may be dispensed in a solid state firstly, and then be melted after contacting with the slider. Now adjusting the position of the row bar 41 so that the part that forms the slider 42 locates on the slider holding portion 22, and a predefined cut gap 43 formed between two adjacent parts, which form the sliders, locates on the space 25. Subsequently, the adhesive 18 is cooled and then hardened, and the row bar 41 is bonded to the bonding surface 24 of the cutting fixture 21 (refer to FIG. 6(b)).

Figure 6B:
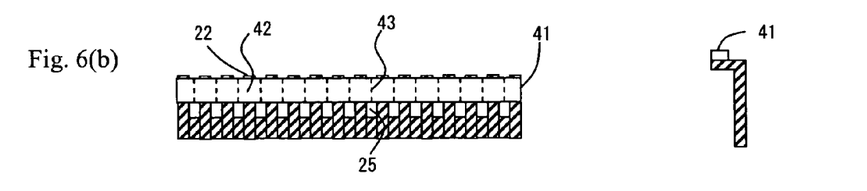

Then dicing the row bar 41 along the cut gap 43 thereon (step 53). As a result, the row bar 41 is divided into individual sliders 42. Since the cut gaps 43 locate on the spaces 25 of the cutting fixture 21, hence a damage to the cutting fixture 21 can be avoided when the cutters passes through the spaces 25 during a dicing process.

Next, performing a cleaning process such that the bonding force between each slider 42 and the corresponding bonding surface 24 decreases. The adhesive 18 is used for holding the slider 42, whereas a great force is required to cut off the row bar 41, therefore the slider 42 may be peeled away from the row bar 41. If the slider 42 is peeled, expensive cutting wheels (very expensive because it is made of diamond) may be damaged and even lose its usage forever. To avoid this accident, enough bonding force along a direction where the pusher 2 pushes the slider 42 should also be ensured. The bonding force needed by an individual slider 42 is about 10N (1 Kgf). However, a slight bonding force is enough to separate the slider 42. The average bonding force may be reduced approximately to 2N (200 gf) when NMP solvent cleans the slider 42 for about 5 minutes. The value of the bonding force mostly equals to that when the slider 42 is dipped into NMP solvent for about 5 minutes and then is cleaned. In addition, it is preferable to measure value of the bonding force periodically.

Moreover, the cleaning operation can is prevented the residual adhesive from getting into later process. Before the cleaning process, the adhesive is left not only on the bonding pad surface or leading edge surface, but also on the region between the slider 24 and the bonding surface 24. If the residual adhesive is taken into the next cleaning process, it will contaminate the cleaning solvent and burden the cleaning process. Furthermore, much contaminant and particle generated in slider cutting or mixing process will be stick to exterior of the adhesive. Once the contaminant and particle are brought into the recesses 32 of the slider tray 31, removal of them will become difficult and they may even be attached to the slider 42. The step is able to prevent the contaminant and particle from being brought into next process.

Figure 6C:
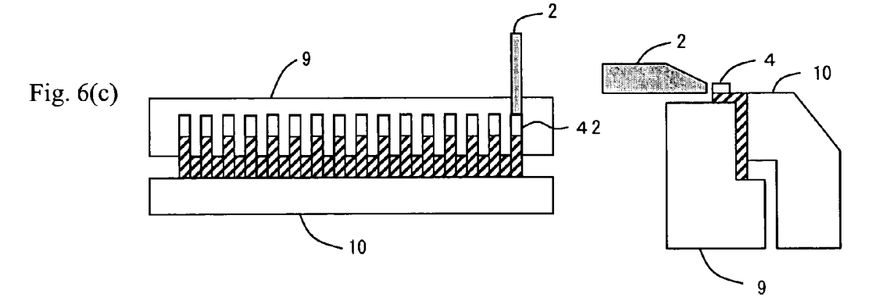
Figure 6D:
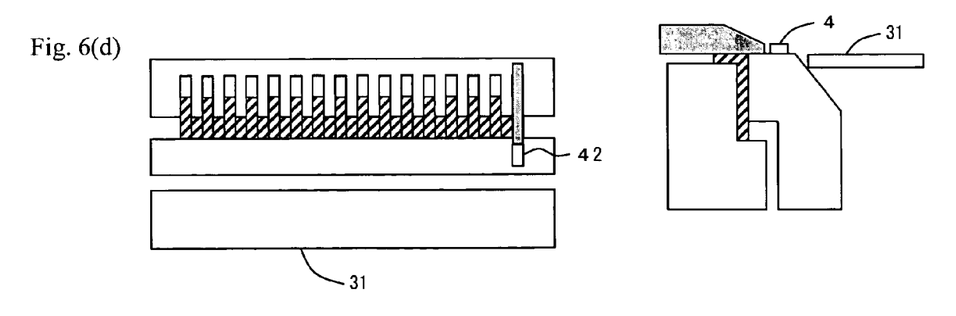

Then, positioning the cutting fixture 21 between the inner fixture securing member 9 and outer fixture securing member 10 and hold it therebetween (refer to FIG. 6(c)) (step 55). It is preferable to make the bonding surface 24 of the cutting fixture 21 coplanar with the top surface of the outer fixture securing member 10.

Next, heating the slider 42 (step 56). When being heated, the adhesive 18 is softened and then turned into a semi-liquid state for it is a holt-melted adhesive, and the slider 42 is held on the bonding surface 24 by a weak bonding force at extent that the slider 42 cannot move along the bonding surface 24 naturally. Heating temperature depends on characteristics of the adhesive, for example, when glycol phthalate is adopted as adhesive, corresponding heating process is directed to soften but not melt the adhesive. As described above, the slider 42 may be separated by applying a force of 2 N without heating process, however, because the adhesive 18 is solid and has no viscosity in common temperature, the slider 42 may be separated and fly off the cutting fixture 21, thus the slider 42 may be missed. On the contrary, if the adhesive 18 becomes viscous, the slider 42 will stably move along the cutting fixture 21 and glide to the outer fixture securing member 10 after separated from the cutting fixture 21. The adhesive 18 should be heated to at least 308K(35° C.), preferably to 313K(40° C.) so that the adhesive 18 becomes viscous and keeps a certain bonding force.

On the other hand, if glycol phthalate is adopted as adhesive, since the melt point of glycol phthalate is about 80° C., overheating will make the adhesive melted and thus the slider 42 will move before it is separated. In this case, the slider 42 is difficult to be pushed directly, and may collide with other sliders 42 and thus generate chippings. In addition, another problem also arises: besides worsening of the operability caused by high temperature, the particle will be strongly attached to the slider 42. In addition, overheating may make the adhesive lose its viscosity or bonding ability, thus the slider 42 is susceptible to moving when influenced by external factors, therefore, it is preferable to control the heating temperature under 318K(45° C.).

Next, the pusher 2 is moved by the x direction moving mechanism 5 to front of the slider 42 to be separated (step (57)). Then the pusher 2 is moved along y-direction by the y-direction moving mechanism 7 such that the slider 42 to be separated is pushed toward y direction. That is, the slider 42 is pushed along a lateral direction, which is parallel to the bonding surface 24 and perpendicular to the length direction. Since the bonding force which bonds the slider 42 to the bonding surface 24 becomes very weak in this step, and the adhesive 18 has a certain bonding force, the slider 42 may be easily separated from the bonding surface 24 by a weak force and glide on the bonding surface 24.

If the slider 42 is pushed sufficiently, there will form enough space at two sides of the slider 42. Accordingly, the slider 42 may be fetched out automatically or manually (step58). The sliders 42 thus fetched may be carried to an inspection area equipped with a microscope (not shown), then the ID code of each slider 44 is compared to data information of defective or non-defective products, and only non-defective products are carried into the recesses 32 of the slider tray 31. In an embodiment of the invention, the data information of defective or non-defective products may be obtained by monitoring a personal computer disposed at the separating device 1. In addition, the ID code of the slider may also be regarded as an ID code 44 for only one slider of a row bar.

Since the sliders are arranged in a row bar with certain regularity, when an ID code of one slider of the row bar is obtained, all the ID codes 44 of the sliders of the row bar will be obtained according to regular arrangement of the sliders in the row bar. Benefiting from this nature, by comparing all the sliders of the row bar with pre-measured data information of defective and non-defective products, the pusher 42 has option to push and separate only non-defective products prior to the step 57. Accordingly, sorting process may be omitted here and later working efficiency may be improved.

Figure 7A:
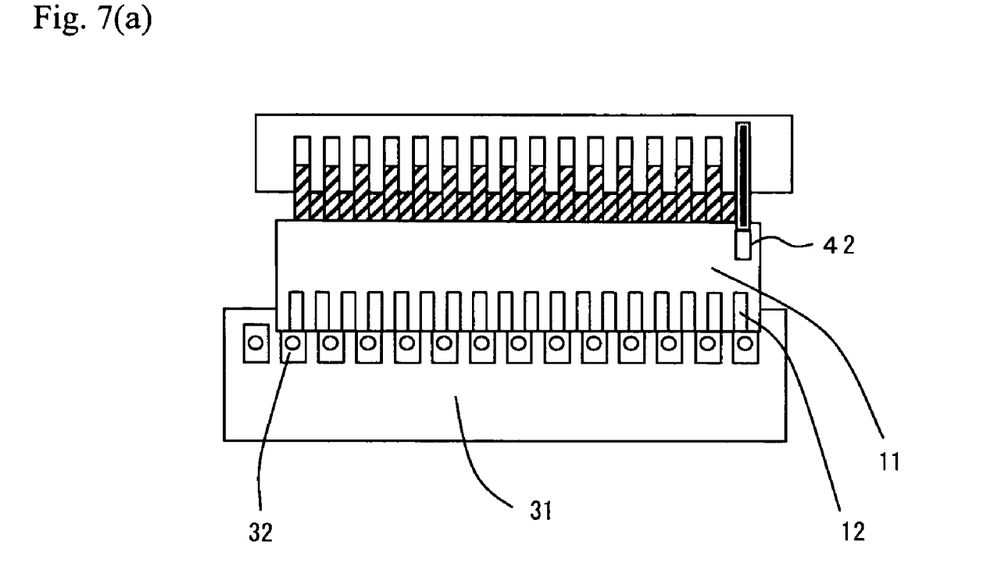
FIGS. 7(a)-7(b) show plan views of a separating device according to another embodiment of the invention.
Figure 7B:
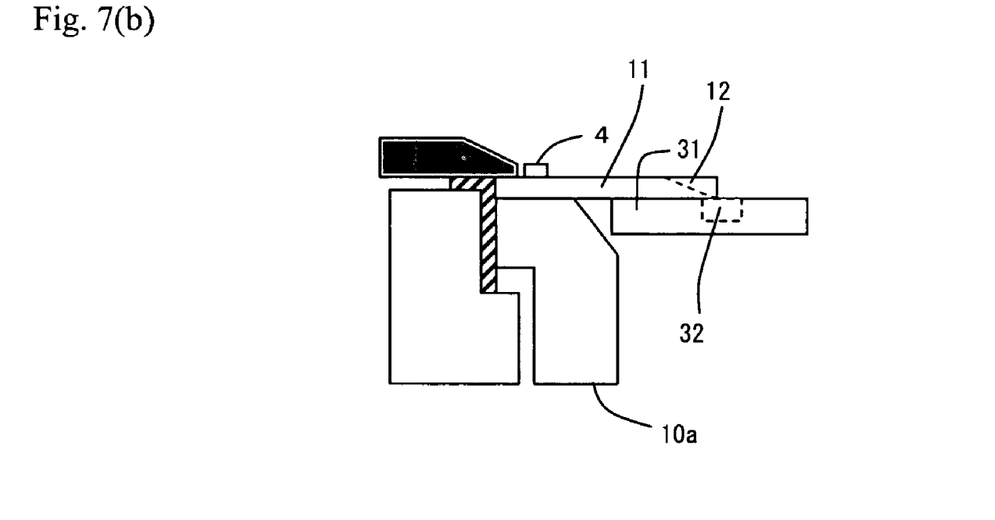

In addition, as illustrated in FIGS. 7(a)-7(b), an upper transitional plate 11 with a groove 12 formed therein may be provided on an outer fixture securing member 10a to replace the outer fixture securing member 10. FIG. 7(a) is a plan view of the separating device, and FIG. 7(b) is a cross-sectional view of the separating device shown in FIG. 7(a). By using the separating device of this configuration, the slider 42 may be pushed by the pusher only to the groove 12 of the upper transitional plate 11, once the slider 42 is pushed out, it is able to glide to the recess 32 of the slider tray 31 automatically. The sliders may be pushed after all the sliders are aligned with respective grooves 12 and recesses 32, so that the slider tray 31 is able to move horizontally and vertically. In addition, the shape of the groove 12 of the upper transitional plate is not limited to that shown in FIG. 7, it may be consistent with that of the slider tray 31 and change its length, or has a vertical through hole for replacing the groove 12.

If moving the slider tray 31 along x direction based on actual requirement, and repeat the steps 57, 58 according to amount of the sliders, then all the non-defective sliders 42 will be contained into the slider tray 31. After that, cover the slider tray 31 (not shown), induce purified water into the slider tray 31 via its apertures 33, and then vibrate the slider tray 31 so that the sliders 42 are being cleaned. The cleaned sliders are assembled to respective HGAs after several times of cleaning or inspection.

Accordingly, the invention has the following various advantages: firstly, since the sliders are transported to the slider tray one by one, dimension of the slider tray and position of the recesses are not confined to specific limitation and the same slider tray independent from pitch of the sliders may also be used. Additionally, when size of slider and pitch changes, the separating device can be used commonly.

Furthermore, as the sliders are separated from the cutting fixture one by one, it is ensured that only non-defective sliders are selected and moved on the slider tray. Thus the number of defective sliders that enter into the recesses is decreased clearly. Especially, when the pitch of parts that form sliders is reduced for miniaturizing slider or increasing quantity of the sliders taken from a wafer, the size and pitch of the recesses may still be designed as big as enough, therefore the operability is improved and the interfusion rate of defective products is reduced.

In addition, the recesses are disposed in entire area of the slider tray; therefore, slider-containing capacity of the slider tray may be increased even if the size and pitch of the recesses are big enough, thus making the cleaning process optimized.

Furthermore, the solvent-dipping process for dissolving the adhesive is eliminated; accordingly, the ABS of the slider becomes free from solvent pollution and becomes cleanlier. Moreover, the slider is seated in the recess with its ABS facing up such that slider-turning process is eliminated and work efficiency is improved. Additionally, since only non-defective sliders are stored in the slider tray, it is almost impossible that some recesses will become vacant due to removal of defective sliders from the recesses; therefore, an additional process of putting non-defective sliders into the vacant recesses is avoided.

The above descriptions are only preferred embodiments of the invention, but not limited to these embodiments, it may take various modifications. For example, depending upon time for cleaning or type of adhesive, the heating process may be eliminated, and depending upon adhesive or heating condition, the cleaning process may be omitted.

Furthermore, the row bar of the embodiment may be diced firstly, and then mounted to the separating device, or may be mounted to the separating device firstly, and then diced. In addition, several pushers with different size of front portions may be prepared according to different size of the sliders, and then suitable pusher may be selected according to specific slider. Furthermore, many identical pushers may be prepared for pushing individual sliders that are separated from each other.

What is claimed is:

1. A slider separating method, which is provided for cutting a row bar constituted with a plurality of slider-forming portions along the row bar's length direction into individual sliders, comprising:
    bonding said row bar to a bonding surface of a cutting fixture along a side surface that extends in the length direction;
    cutting said row bar bonded on said cutting fixture into individual sliders along cutting gaps provided between the slider-forming portions;
    decreasing bonding force between each diced slider and the bonding surface; and
    separating said sliders with decreased bonding force from said cutting fixture by pushing each slider along a side direction being parallel to said bonding surface and perpendicular to said length direction to a position where the slider is inconsistent with its adjacent sliders when viewed from, said length direction and then holding and receiving the pushed slider to a slider tray having recesses formed therein which are partitioned respectively to said sliders.

2. The slider separating method as claimed in claim 1, wherein a holt-melt adhesive is used for bonding said row bar to the bonding surface of the cutting fixture.

3. The slider separating method as claimed in claim 2, wherein decreasing bonding force between each diced slider and the bonding surface is performed by cleaning or heating said adhesive, or by cleaning and heating said adhesive.

4. The slider separating method as claimed in claim 2, wherein said holt-melt adhesive includes glycol phthalate.

5. The slider separating method as claimed in claim 2, wherein decreases bonding force between each diced slider and the bonding surface is performed by heating said adhesive to a temperature of 308K-318K so that the adhesive is in a semi-liquid status.

6. The slider separating method as claimed in claims 1, further comprising holding said cutting fixture against said side direction before separating said sliders.

7. The slider separating method as claimed in claims 1, further comprising attaching a slider ID code on said each slider-forming portion prior to bonding said row bar to the bonding surface of the cutting fixture.

8. The slider separating method as claimed in claim 7, further comprising reading said ID code on each slider-forming portion of said row bar, comparing said ID code with corresponding data information of defective or non-defective sliders, and only separating non-defective sliders from said cutting fixture prior to separating said sliders.

* * * * *